July 28, 1925.
R. C. ALLEN
BALANCING MACHINE
Filed Feb. 28, 1921
1,547,487
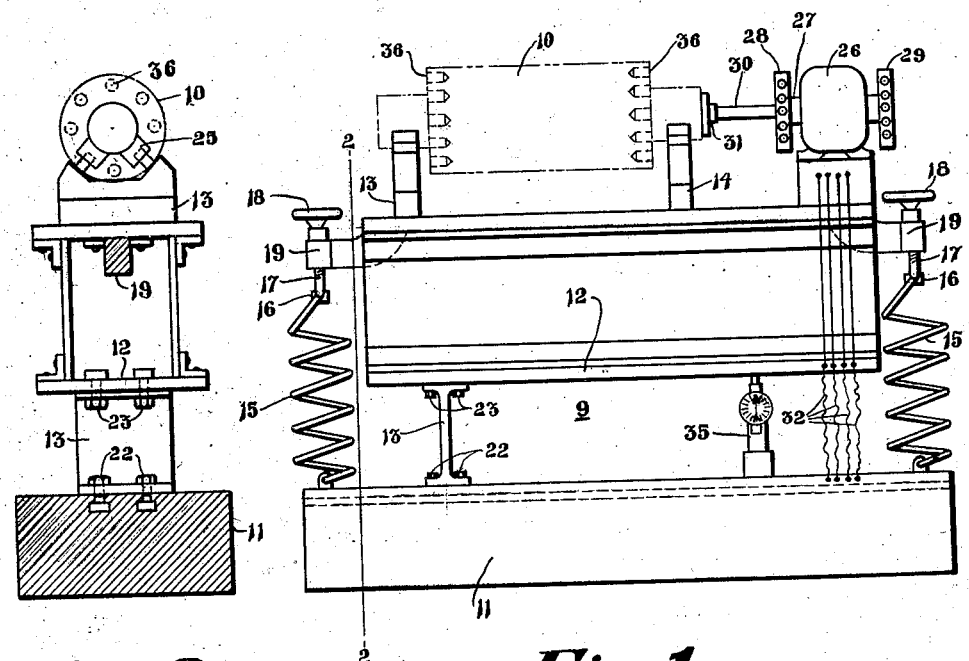
*Fig.2.*  *Fig.1.*
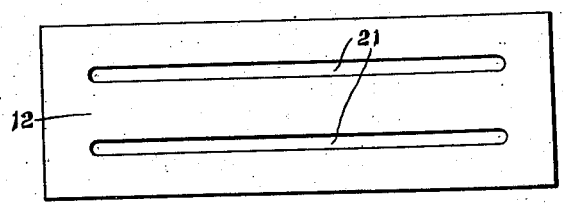
*Fig.3.*
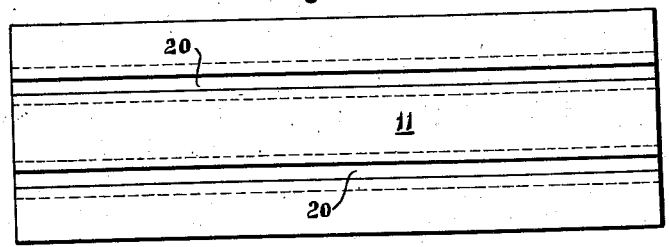
*Fig.4.*
Robert C. Allen
INVENTOR
BY D. C. Davis
ATTORNEY Patented July 28, 1925.

1,547,487

UNITED STATES PATENT OFFICE.

ROBERT C. ALLEN, OF ESSINGTON, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed February 28, 1921. Serial No. 448,480.

*To all whom it may concern:*

Be it known that I, ROBERT C. ALLEN, a citizen of the United States, and a resident of Essington, in the county of Delaware and State of Pennsylvania, have invented a new and useful Improvement in Balancing Machines, of which the following is a specification.

My invention relates to balancing machines, particularly of the combined static and dynamic type, and it has for an object to provide a method and apparatus of this character which shall be capable of simple operation and which shall give accurate results.

As heretofore constructed, balancing machines for placing bodies in running or dynamic balance have required, in their operation, considerable calculation and cut-and-try operations or else an elaborate compensating mechanism. Accordingly, it is the purpose of my invention to avoid these objections by a design of machine wherein the unbalanced condition of a rotor is indicated at one end at a time and appropriate corrections made to overcome the unbalanced condition. After one end is balanced, an adjustment of the machine is made for balancing the other end, and then the other end is balanced.

It has been proposed to balance rotary bodies by having vibratory supports or members for each end of a body. Such vibratory members or supports are ordinarily provided with bearings for the trunnions of a body; and, for convenience, rotors to be balanced are ordinarily provided with balance openings at each end. In operation, one vibratory member is held while the other is free to vibrate, and balancing operations are carried on in connection with the free end, after which the free end is fixed and the formerly fixed end is freed for balancing. In view of the fact that the planes of the balance openings are spaced from the median planes of the supporting bearings, the unbalance at the end of a body adjacent to a fixed support develops a moment which combines with the moment at the free end to produce a resultant which is the quantity actually observed. In order to effect accurate balancing, it is, therefore, necessary to make allowance for the disturbing moment of the end of a body adjacent to a fixed support in order to ascertain the true extent and location of unbalance at the other end of the body. If the body being balanced could be so mounted that its fixed end would have the plane of its balance openings include the axis of vibration, then the disturbing moment at that end would be zero and the observations at the other end would truly indicate the position and extent of unbalance. In accordance with my invention, therefore, I provide a vibratory member whose axis of vibration may be adjusted to coincide with either plane of correction so that corrections may be made to compensate for unbalance at each end of a rotor without affecting the balance at the other end.

Apparatus embodying features of my invention is illustrated in the accompanying drawings, forming a part of this application, in which:

Fig. 1 is a side elevation of a balancing machine incorporating my improvements;

Fig. 2 is an end elevation thereof; and

Figs. 3 and 4 are detailed views of the lower face of the vibratory frame and the upper face of the base plate, respectively.

Referring to the drawings for a more detailed description of my invention, a balancing machine 9 is shown, upon which is mounted a rotary body 10 to be placed in static and dynamic balance.

The machine comprises a base member 11, preferably of massive and rigid construction, to which is connected a vibratory frame 12 by suitable flexible means, for example, an I-beam 13, which has its web portion disposed transversely or normally with respect to the base member and the frame member. The vibratory frame 12 carries upon its upper face bearing pedestals 13 and 14 for the trunnions or journals of the body to be balanced.

Adjustable spring connections are provided between the vibratory frame and the rigid base member, there preferably being a connection for each end of the vibratory frame. Each adjustable connection comprises a spring 15 secured to the base member at its lower end and secured by means of a swivel 16 to an adjustable screw 17 having a hand wheel 18 for manual operation. The screws are mounted in brackets 19 secured to the vibratory frame. By adjusting the screws, the tension of the springs may be varied, whereby they are capable of functioning to magnify the vibrations of the member being balanced through resonance.

The base member 11 is provided with machined grooves 20 and the vibratory frame has longitudinal slots 21. The I-beam connection 13 has appropriate openings for adjusting screws or bolts 22 fitting in the machined grooves 20 and for adjusting screws or bolts 23 fitting in longitudinal slots 21. This construction permits of the adjustment of the I-beam connection longitudinally of the vibratory frame, whereby it may be brought into the plane of a particular portion of the body to be balanced, for example, end planes of correction.

The rotor 10 is provided with journals or trunnions adapted to be mounted on bearings carried by the pedestals 13 and 14. As shown in Fig. 2, each of the bearings comprises pivoted shoes 25 which cooperate with the journal or trunnion portions to form a load-supporting wedge-shaped oil films. A bearing of this type has a high capacity for loads due to the uniform distribution of the load throughout the surface of the wedge-shaped oil film, and, also, due to the effective arc of bearing, slight irregularities or deviations of the journal from its true theoretical shape are averaged, thereby minimizing any vibrations which would otherwise occur. In so far as the present invention is concerned, however, it is obvious that any type of bearing might be associated with the pedestals 13 and 14.

A motor 26 is supported at one end of the vibratory frame 12 and has its armature shaft 27 provided with balancing rings 28 and 29, each of the balancing rings having radial openings disposed therearound wherein any appropriate material may be inserted for the purpose of bringing the armature shaft into static and dynamic balance. The armature shaft is connected to one of the journals or trunnions of the rotor by means of a flexible shaft 30 and an appropriate coupling 31. Motor leads 32 are shown carried by the vibratory frame 12 and connected to the base member 11, the portions thereof between the vibratory frame and the base member 11 being readily extensible whereby the vibrations of the vibratory frame are not sensibly affected thereby.

An indicating device 35 is mounted on the base member 11 and cooperates with the vibratory frame to indicate vibrations as well as their magnitude.

The rotor is provided with an annular series of tapped holes 36 in each end, equidistantly spaced circumferentially, and into which threaded plugs may be inserted in order to balance the body, although it will be obvious that any mode of modifying the distribution of mass might be adopted.

The operation of apparatus incorporating my improvement is as follows: The rotary body 10 to be placed in static and dynamic balance has its journal or trunnion portions mounted in the bearings carried by the pedestals 13 and 14. The armature shaft 27, which, with its armature, has been placed in static and dynamic balance, is connected to one of the trunnions or journals by means of a flexible shaft and coupling. The adjustable I-beam 13 is secured in position with reference to the vibratory frame and base member with its web portion in the vertical plane of one series of tapped openings 36; whereupon the electric motor is started and vibrations of the vibratory frame 12 in a vertical plane are observed on the indicator 35 when the revolutions per minute correspond to the number of natural vibrations per minute of the vibratory frame, that is, when the amplitude of the vibrations is a maximum. Threaded plugs are inserted in the openings 36 until the vibrations substantially cease, the size and location being determined by trial and error. The springs 15 may have their tension varied for the purpose of properly leveling the vibratory frame and giving the springs adequate tension. After the right-hand end of the rotating body has attained a state of running balance, the I-beam connection is shifted relatively to the vibratory frame and base member and secured in position with its web portion in the plane of the right-hand tapped openings 36 whereupon the body is rotated and the left-hand end balanced in a similar manner.

From the foregoing, it will be seen that I have devised a balancing machine in which the operation of the balancing is divided. In other words, I balance one end of a rotary body and then balance the other, thereby eliminating considerable calculation, cut-and-try operations or elaborate compensating mechanisms.

While I have shown an I-beam connection between the vibratory frame or member 12 and the base member or bed plate 11, it will be obvious to those skilled in the art that any arrangement which will permit of the vibratory member moving about an axis falling within one of the correction planes may be used. I wish it to be understood, therefore, that the word "flexible" is used in this specification and the appended claims in a broad sense to signify any type of connection which will permit of movement in the manner stated.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. In a balancing machine, the combination of a base member, a vibratory frame adapted to support a rotary body to be placed in static and dynamic balance, and a flexible supporting connection between the vibratory frame and the base member and adjustable relative thereto to be brought into the plane of one end of the rotary body while the other end is being balanced.

2. A balancing machine comprising a base member, a vibratory frame, bearings carried by the frame for a rotary member adapted to have end balancing portions to be balanced, a flexible supporting member connecting the vibratory frame and the base member and adjustable relatively to the frame and base member whereby it may be brought into the vertical plane of one end balancing portion while the other end balancing portion is being balanced.

3. In a balancing machine, the combination of a vibratory member, a base member, bearings carried by the vibratory member for a member to be balanced, a motor carried by the vibratory member, means to balance the rotary element of the motor, a flexible shaft adapted to connect the motor and the member to be balanced, an I-beam for supporting the vibratory member on the base member and adjustable with reference to the base member and vibratory member so that it may be brought into the plane of one end of the body to be balanced while the other end balancing portion is being balanced.

4. A balancing machine comprising a vibratory supporting member for a body to be balanced, a base member, a flexible member disposed transversely of the supporting and base members, and means whereby the flexible member may be adjusted to different positions longitudinally of the vibratory supporting and base members.

5. In a balancing machine, the combination of a vibratory frame for supporting a body to be balanced which has end planes of correction, a base member, and an I-beam connection between the vibratory frame and the base member and adjustable with respect thereto so that the web portion of the I-beam may be placed in the correction plane of an end of the body while the other end is being balanced.

6. In a balancing machine, the combination of a vibratory frame, a base member, an I-beam member carried by the base member for supporting the frame, means for adjusting the I-beam member in different positions with respect to the base member and the frame, springs for connecting the frame to the base member, and means for varying the tension of the springs.

7. In a balancing machine, the combination of a vibratory member, a base member, an I-beam member carried by the base member for supporting the vibratory member, means for adjusting the I-beam member to different positions with respect to the vibratory member and the base member, and adjustable tension means between the ends of the vibratory member and the base member.

In testimony whereof, I have hereunto subscribed my name this 23rd day of February, 1921.

ROBERT C. ALLEN.